US008298703B2

(12) United States Patent
Yoon et al.

(10) Patent No.: US 8,298,703 B2
(45) Date of Patent: Oct. 30, 2012

(54) BATTERY MODULE OF IMPROVED SAFETY AGAINST EXTERNAL IMPACT

(75) Inventors: Junill Yoon, Daejeon (KR); Seung-Taek Hong, Seoul (KR); Seung-Jin Yang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 502 days.

(21) Appl. No.: 12/446,662

(22) PCT Filed: Oct. 19, 2007

(86) PCT No.: PCT/KR2007/005134

§ 371 (c)(1), (2), (4) Date: Oct. 5, 2009

(87) PCT Pub. No.: WO2008/054080

PCT Pub. Date: May 8, 2008

(65) Prior Publication Data

US 2010/0068608 A1 Mar. 18, 2010

(30) Foreign Application Priority Data

Oct. 30, 2006 (KR) ........................ 10-2006-0105381

(51) Int. Cl.

*H01M 2/02* (2006.01)
*H01M 2/14* (2006.01)
*H01M 2/16* (2006.01)
*H01M 2/18* (2006.01)
*H01G 9/00* (2006.01)

(52) U.S. Cl. ........ 429/179; 429/178; 429/129; 429/131; 429/147; 361/502

(58) Field of Classification Search .................. 429/178, 429/179, 129, 131, 147; 361/502
See application file for complete search history.

(56) References Cited

U.S. PATENT DOCUMENTS 4,992,339 A * 2/1991 Georgopoulos .................. 429/7
6,497,978 B1 12/2002 Takada et al.
6,743,546 B1 * 6/2004 Kaneda et al. ................ 429/127
2004/0121231 A1 6/2004 Kim

FOREIGN PATENT DOCUMENTS

JP 2001-052659 A 2/2001
JP 2003-17014 A 1/2003
KR 10-2005-0036751 A 4/2005
KR 10-2006-0072922 A 6/2006
KR 10-2006-0073383 A 6/2006

* cited by examiner

*Primary Examiner* — Patrick Ryan
*Assistant Examiner* — Julian Anthony
(74) *Attorney, Agent, or Firm* — Birch, Stewart, Kolasch & Birch, LLP

(57) ABSTRACT

Disclosed herein is a battery module including at least one battery cell constructed in a structure in which an electrode assembly of a cathode/separator/anode structure is mounted in a battery case such that electrode leads of the electrode assembly protrude outside, wherein, when external impacts are directly or indirectly applied to the battery cell, with the result that the electrode leads move toward the electrode assembly of the battery cell, the external impacts are absorbed by the deformation of the electrode leads or the deformation of predetermined regions ('electrode lead facing parts') of the module in direct contact with or adjacent to the electrode leads, whereby the occurrence of a short circuit due to the contact between the electrode assembly and the electrode leads is prevented.

15 Claims, 3 Drawing Sheets

BATTERY MODULE OF IMPROVED SAFETY AGAINST EXTERNAL IMPACT

FIELD OF THE INVENTION

The present invention relates to a battery module of improved safety against external impact, and, more particularly, to a battery module including at least one battery cell constructed in a structure in which an electrode assembly of a cathode/separator/anode structure is mounted in a battery case such that electrode leads of the electrode assembly protrude outside, wherein, when external impacts are directly or indirectly applied to the battery cell, with the result that the electrode leads move toward the electrode assembly of the battery cell, the external impacts are absorbed by the deformation of the electrode leads or the deformation of predetermined regions of the module in direct contact with or adjacent to the electrode leads, whereby the occurrence of a short circuit due to the contact between the electrode assembly and the electrode leads is prevented.

BACKGROUND OF THE INVENTION

Recently, a secondary battery, which can be charged and discharged, has been widely used as an energy source for wireless mobile devices. Also, the secondary battery has attracted considerable attention as an energy source for electric vehicles (EV) and hybrid electric vehicles (HEV), which have been developed to solve problems, such as air pollution, caused by existing gasoline and diesel vehicles using fossil fuel.

Small-sized mobile devices use one or several small-sized battery cells for each device. On the other hand, middle- or large-sized devices, such as vehicles, use a middle- or large-sized battery module having a plurality of battery cells electrically connected with each other because high power and large capacity are necessary for the middle- or large-sized devices.

When the secondary battery is used as the power source for the medium- or large-sized devices, a plurality of unit cells (secondary batteries) are connected in series or in series/parallel with each other so as to manufacture a battery module(s) providing high power. Consequently, the battery module is generally constructed in a structure in which the plurality of secondary batteries are electrically connected with each other.

Up to now, nickel-metal hydride secondary batteries have been widely used as the unit cells (battery cells) of the medium- or large-sized battery module. Recently, however, lithium secondary batteries have attracted considerable attention as the unit cells (battery cells) of the medium- or large-sized battery module because the lithium secondary batteries have a high energy density and a high discharge voltage.

Preferably, meanwhile, the middle- or large-sized battery module is manufactured with small size and weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small and the manufacturing costs of the pouch-shaped battery are low.

The pouch-shaped battery is manufactured by receiving an electrode assembly in a battery case, generally made of an aluminum laminate sheet, and thermally welding the outer circumference of a receiving part while electrode leads, connected to the electrode assembly, are exposed outside.

FIG. 1 is a perspective view typically illustrating a conventional representative pouch-shaped battery. The pouch-shaped battery 10 shown in FIG. 1 is constructed in a structure in which two electrode leads 11 and 12 protrude from the upper and lower ends of a battery body 13, respectively, while the electrode leads 11 and 12 are opposite to each other. A sheathing member 14 comprises upper and lower sheathing parts. That is, the sheathing member 14 is a two-unit member. An electrode assembly (not shown) is received in a receiving part which is defined between the upper and lower sheathing parts of the sheathing member 14. The opposite sides **14*a* and the upper and lower ends 14*b* and 14*c*, which are contact regions of the upper and lower sheathing parts of the sheathing member 14, are bonded to each other, whereby the pouch-shaped battery 10 is manufactured. The sheathing member 14 is constructed in a laminate structure of a resin layer/a metal film layer/a resin layer. Consequently, it is possible to bond the opposite sides 14*a* and the upper and lower ends 14*b* and 14*c* of the upper and lower sheathing parts of the sheathing member 14, which are in contact with each other, to each other by applying heat and pressure to the opposite sides 14*a* and the upper and lower ends 14*b* and 14*c* of the upper and lower sheathing parts of the sheathing member 14 so as to weld the resin layers thereof to each other. According to circumstances, the opposite sides 14*a* and the upper and lower ends 14*b* and 14*c* of the upper and lower sheathing parts of the sheathing member 14 may be bonded to each other using a bonding agent. For the opposite sides 14*a* of the sheathing member 14, the same resin layers of the upper and lower sheathing parts of the sheathing member 14 are in direct contact with each other, whereby uniform sealing at the opposite sides 14*a* of the sheathing member 14 is accomplished by welding. For the upper and lower ends 14*b* and 14*c* of the sheathing member 14, on the other hand, the electrode leads 11 and 12 protrude from the upper and lower ends 14*b* and 14*c* of the sheathing member 14, respectively. For this reason, the upper and lower ends 14*b* and 14*c* of the upper and lower sheathing parts of the sheathing member 14 are thermally welded to each other, while a film-shaped sealing member 16 is interposed between the electrode leads 11 and 12 and the sheathing member 14, in consideration of the thickness of the electrode leads 11 and 12 and the difference in material between the electrode leads 11 and 12 and the sheathing member 14, so as to increase sealability of the sheathing member 14**.

However, the pouch-shaped battery has a problem in that the mechanical strength of the sheathing member 14 is low, and therefore, a possibility of a short circuit occurring in the pouch-shaped battery due to an external force is very strong. In order to solve this problem, a plurality of battery cells are mounted in a module member, such as a cartridge or a pack case, to manufacture a battery module.

However, the battery module with the above-stated construction still has a possibility of an internal short circuit occurring. Specifically, the mechanical strength of the module member is greater than the sheathing member, made of the laminate sheet, of each battery cell. For this reason, when external impacts are applied to the battery cells of the battery module, the electrode leads, which are somewhat rigid, move toward the laminate sheet and the electrode assembly, which have relatively low strength. As a result, there is a possibility of internal short circuit occurring.

More specifically, when external impacts are applied to the battery cell at one side where the electrode terminals of the battery cell are located, when the battery cell drops with the electrode terminals thereof down, or when external impacts are applied to the battery cell at the other side opposite to the one side where the electrode terminals of the battery cell are located, the somewhat rigid electrode leads moves toward the electrode assembly, with the result that the ends of the electrode terminals are brought into contact with the electrode assembly, and therefore, a possibility of an internal short circuit occurring is increased. Especially when the battery module is mounted in devices, which are exposed to external impacts and vibration, such as electric bicycles and electric vehicles, a possibility of the battery catching fire or exploding due to an internal short circuit is greatly increased, and therefore, a safety of the battery module is seriously lowered.

FIG. 2 is a typical view illustrating a process of an internal short circuit occurring due to the contact between an electrode lead and an electrode assembly in a general battery module.

Referring to FIG. 2, when an external force is applied to a battery cell 100 at one side where an electrode lead 101 of the battery cell 100 is located or when an external force is applied to the battery cell 100 at the side opposite to the one side where the electrode lead 101 of the battery cell 100 is located, the electrode lead 101 is brought into contact with a specific region 201 of a module member 200, such as a cartridge or a pack case, in direct contact with or adjacent to the electrode lead 101. As a result, the battery case, which has a strength lower than that of the module member 200, is deformed, and therefore, the electrode lead 101 moves toward an electrode assembly (not shown) of the battery cell. Consequently, an internal short circuit due to the contact with the electrode lead 101 and the electrode assembly of the battery cell occurs, whereby the battery may catch fire or explode.

Consequently, there is a high necessity for a technology that is capable of fundamentally preventing the occurrence of an internal short circuit due to the movement of the electrode lead caused by external impacts applied to the battery module.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, when a battery module is constructed such that, when an external force is applied to the battery module, an electrode lead is deformed, or a predetermined region of a module member in contact with or adjacent to the electrode lead is deformed, whereby the applied external force is absorbed, the movement of the electrode lead toward an electrode assembly is restrained, and therefore, the occurrence of an internal short circuit is prevented. The present invention has been completed based on these findings.

In accordance with one aspect of the present invention, the above and other objects can be accomplished by the provision of a battery module including at least one battery cell constructed in a structure in which an electrode assembly of a cathode/separator/anode structure is mounted in a battery case such that electrode leads of the electrode assembly protrude outside, wherein, when external impacts are directly or indirectly applied to the battery cell, with the result that the electrode leads move toward the electrode assembly of the battery cell, the external impacts are absorbed by the deformation of the electrode leads or the deformation of predetermined regions ('electrode lead facing parts') of the module in direct contact with or adjacent to the electrode leads, whereby the occurrence of a short circuit due to the contact between the electrode assembly and the electrode leads is prevented.

Even when an external force is directly or indirectly applied to the battery module according to the present invention to such an extent that the electrode leads and the electrode assembly move toward each other, the deformation of the electrode leads or the deformation of the electrode lead facing parts is caused, by the simple construction, to absorb the external force, and therefore, the movement of the electrode leads toward the electrode assembly is restrained. Consequently, the occurrence of an internal short circuit due to the contact between the electrode leads and the electrode assembly is prevented, and therefore, the safety of the battery is greatly improved.

The 'the electrode leads move toward the electrode assembly of the battery cell' means the decrease of the distance between the electrode leads and the electrode assembly due to the movement of the electrode leads or the electrode assembly. For example, a downward force (external force) may be applied to the electrode leads, with the result that the electrode leads may be pushed, or an upward force (external force) may be applied from the lower end of the battery cell opposite to the electrode leads, with the result that the electrode assembly may move toward the electrode leads.

In the present invention, the external force, applied to the battery cell, may be applied in various different directions. The direct application of the external force means when the electrode terminals are directly influenced by the external force, for example, when the external force is applied to the electrode terminals of the battery cell or when the battery cell drops with the electrode terminals thereof down. At this time, the downward force is applied to the electrode leads, with the result that the electrode leads are pushed toward the electrode assembly. Also, the external force may be applied to the battery cell from the opposite side to the electrode terminals. In this case, the upward force (external force) is applied from the lower end of the battery cell, with the result that the electrode assembly moves toward the electrode leads, and therefore, the distance between the electrode assembly and the electrode leads is decreased.

On the other hand, the indirect application of the external force means when the external force is applied to a battery cartridge or a module case, with the result that the electrode terminals are indirectly influenced due to the movement of the battery cartridge or the module case relative to the battery cell.

Consequently, when the battery cell is directly or indirectly influenced, the electrode leads moves toward the electrode assembly of the battery cell. These cases are included in conditions of the present invention.

The battery cell may be constructed in the form of a plate having a small thickness and a relatively large width and length such that, when a plurality of battery cells are stacked to construct the battery module, the total size of the battery cells is minimized.

In a preferred embodiment, the battery cell is constructed in a structure in which an electrode assembly is mounted in a battery case made of a laminate sheet including a resin layer and a metal layer. Specifically, the battery cell may be constructed in a structure in which the electrode assembly is mounted in a pouch-shaped case made of an aluminum laminate sheet. The secondary battery with the above-stated construction may be referred to as a pouch-shaped battery cell. In this case, electrode terminals protrude from one end of the battery case.

The laminate sheet may be constructed, for example, in a structure in which a highly durable resin layer is attached to one side (outside) of the metal layer, as the isolation layer, and a thermal melting resin layer is attached to the other side (inside) of the metal layer.

The battery case made of such a laminate sheet is mainly used as a case for pouch-shaped batteries. This battery case is used to manufacture a battery that can be stacked with high integration and a small weight to capacity ratio. Especially, this battery case is used to manufacture a battery cell for a middle- or large-sized battery module that is required to be manufactured with a small size and weight if possible.

In the pouch-shaped battery cell, the electrode assembly may be constructed in a structure in which both the cathode terminal and the anode terminal are formed at one side of the electrode assembly or in a structure in which the cathode terminal is formed at one side of the electrode assembly, whereas the anode terminal is formed at the other side of the electrode assembly opposite to the one side of the electrode assembly. In the present invention, the electrode assembly is not particularly limited to the above-described structure.

The structure of the electrode assembly is not particularly restricted so long as the cathodes and the anodes are stacked while the separators are disposed respectively between the cathodes and the anodes. Preferably, the electrode assembly is constructed in a winding, stacking, or stacking/folding structure. Also, the electrode terminals, including the electrode leads and the electrode tabs, are preferably constructed in the form of a plate. The electrode terminals of the plate-shaped structure have a specific strength in the longitudinal direction thereof. As a result, the electrode terminals are not deformed by an external force, and moves toward the electrode assembly. Consequently, the movement of the electrode assembly is restrained through the deformation of the electrode leads, as the electrode terminals, or the deformation of the electrode lead facing parts according to the present invention, and therefore, the safety of the battery is improved.

As a method of absorbing the applied external force through the deformation of the electrode leads, for example, the electrode leads may be deformed at the regions where the electrode leads strike, and therefore, the external force is absorbed without the movement of the electrode leads. Alternatively, the structure of the electrode lead facing parts may be modified such that the electrode leads are deformed, for example, bent. In this case, the material for the electrode lead facing parts of the module member is not particularly restricted. It is possible to use the electrode lead facing parts even when the electrode lead facing parts are made of a material having a high mechanical strength.

In a preferred embodiment, the electrode lead facing parts are constructed in an upward or downward incline structure. Consequently, when the upward force is applied from the lower end of the battery cell opposite to the electrode leads, with the result that the electrode assembly moves toward the electrode leads, or when impacts are applied to the cartridge or the module case in the direction of the electrode leads, with the result that the downward force is applied to the electrode leads, the electrode leads are bent upward or downward along the upward or downward incline of the electrode lead facing parts, with the result that the electrode leads are deformed to absorb the external force, and therefore, the movement of the electrode leads toward the electrode assembly is restrained.

According to circumstances, the electrode lead facing parts may be constructed in a curved incline structure. Consequently, the electrode leads are bent along the curved incline by the electrode lead facing parts of the curved incline structure, with the result that the electrode leads are deformed, and therefore, the movement of the electrode leads toward the electrode assembly is restrained, whereby the occurrence of a short circuit is prevented.

As a method of absorbing the applied external force through the deformation of the electrode lead facing parts, for example, the electrode lead facing parts may be deformed such that the external force is absorbed without the movement of the electrode lead toward the electrode assembly, when the external force is applied to the battery cell.

In a preferred embodiment, the electrode lead facing parts are constructed in an easily deformable structure or are made of an easily deformable material. For example, the electrode lead facing parts may be made of an elastically deformable material, such as rubber, or a plastically deformable material, such as styrene foam or cork.

However, when the electrode lead facing parts are located on the module member, such as the cartridge or the module case, for example, to complement the mechanical safety of the battery cell, only a portion of the module member facing the electrode leads may be made of a deformable material, or electrode lead facing parts made of such a material may be additionally mounted or attached to the module member, such that the module member maintains a predetermined mechanical strength.

Generally, the battery module is constructed in a structure in which the battery cell is mounted in a cartridge or a module case such that the battery module is effectively mounted in a limited installation space of a device or a vehicle, in which the battery module is mounted, while the overall mechanical strength of the battery cell is complemented.

In a preferred embodiment, the at least one battery cell, as a unit cell constituting the battery module, is mounted in a cartridge, and a plurality of cartridges are stacked to construct the battery module. In this case, the electrode lead facing parts may be a portion of the cartridge in which the at least one battery cell is mounted.

Examples of the cartridge are disclosed in Korean Patent Application Publication No. 2005-36751 and No. 2006-72922, which have been filed in the name of the applicant of the present patent application. Specifically, the cartridge disclosed in Korean Patent Application Publication No. 2005-36751 includes an upper plate and a lower plate which are coupled to each other and disposed above and below at least two battery cells, adjacent electrode tabs of which are interconnected to form a predetermined series circuit with a corresponding device, such that the at least two battery cells are partially surrounded by the upper plate and the lower plate. On the other hand, the cartridge disclosed in Korean Patent Application Publication No. 2006-72922 includes a pair of outer frame members a and b, and an inner frame member c disposed between the outer frame members a and b. Also, the cartridge is constructed in a structure in which a battery cell is mounted between the first outer frame member a and the inner frame member c, and another battery cell is mounted between the second outer frame member b and the inner frame member c. In addition, the inner frame member c is provided with a plurality of through-holes, which communicate with the outside while the battery cells are mounted between the corresponding frame members.

In a preferred embodiment, a plurality of battery cells are mounted in a module case such that the battery cells are stacked. In this case, the electrode lead facing parts may be a portion of the module case in which the battery cells are mounted.

An example of the module case is disclosed in Korean Patent Application Publication No. 2006-73383, which have been filed in the name of the applicant of the present patent application. The disclosed module case constitutes a battery module including a plate for allowing a plurality of battery cells to be stacked thereon such that the battery cells are electrically connected with each other to charge and discharge electricity of high power and large capacity and a circuit unit for controlling the operation of the battery. Specifically, the module case includes a rectangular lower case having an upper end receiving part, in which the battery cells are sequentially stacked, and a rectangular upper case having a lower end receiving part for covering the upper end of the battery cells stacked on the lower case.

Consequently, the electrode lead facing parts may be constructed in a structure in which the electrode leads are deformed or in which the electrode lead facing parts themselves are deformed, in the module case in which the battery cells are mounted while being stacked, whereby the external force is absorbed, and therefore, the occurrence of a short circuit due to the movement of the electrode leads toward the electrode assembly is prevented.

The battery cell may be a unit cell of the battery module. Preferably, the battery cell is a secondary battery or a super capacitor.

In accordance with another aspect of the present invention, there is provided a middle- or large-sized battery pack of high power and large capacity including the battery module with the above-stated construction. The middle- or large-sized battery pack according to the present invention may be manufactured by appropriately combining one or more battery modules depending upon a desired power and capacity. Preferably, the battery pack according to the present invention is used as a power source for electric vehicles, hybrid electric vehicles, electric bicycles, or electric motorcycles, which have a limited installation space and are easily exposed to external impact.

The general construction of the middle- or large-sized battery pack and a manufacturing method of the same are well known in the art to which the present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 3:
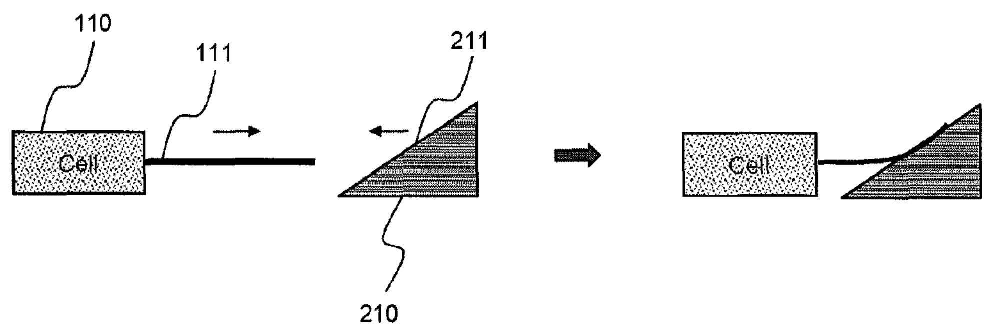
FIG. 3 is a typical view illustrating a process of absorbing an external force through the deformation of an electrode lead in a battery module according to a first preferred embodiment of the present invention.
Figure 4:
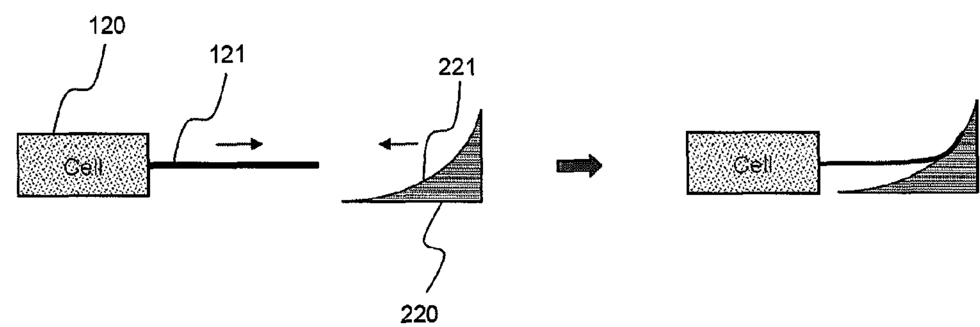
FIG. 4 is a typical view illustrating a process of absorbing an external force through the deformation of electrode lead in a battery module according to a second preferred embodiment of the present invention.

FIGS. 3 and 4 typically illustrate a process of absorbing external impacts through the deformation of an electrode lead by the structure of an electrode lead facing part when the external impacts are applied to battery modules according to preferred embodiments of the present invention. FIG. 3 illustrates an example of the electrode lead facing part, which is constructed in an upward incline structure, and FIG. 3 illustrates another example of the electrode lead facing part, which is constructed in a curved incline structure.

Figure 1:
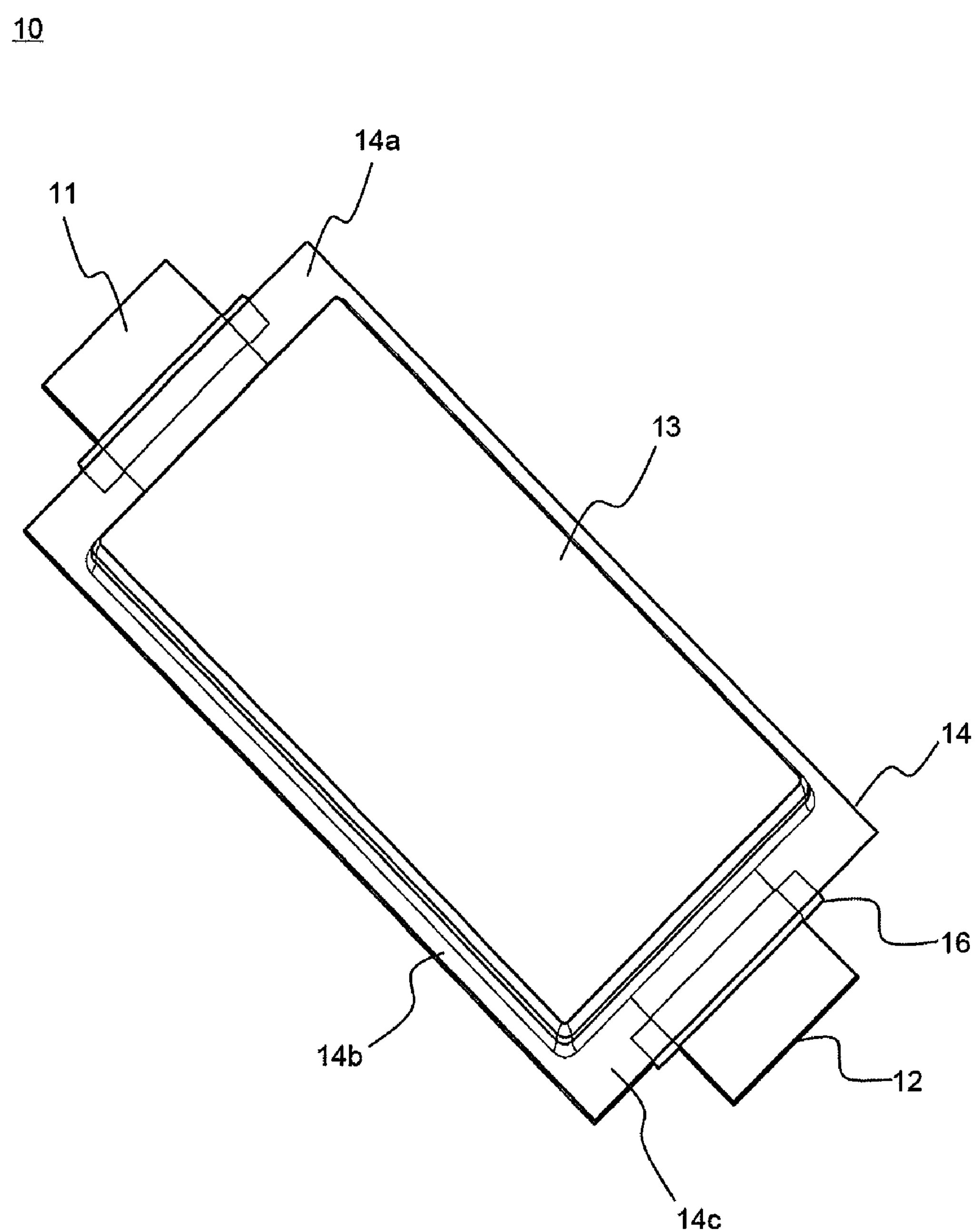
FIG. 1 is a perspective view illustrating a conventional representative pouch-shaped battery.
Figure 2:
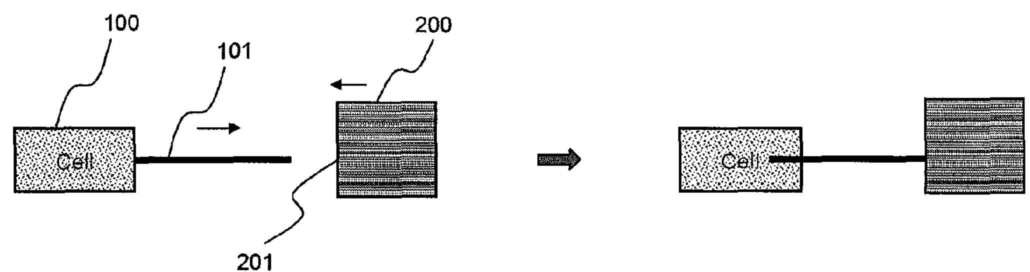
FIG. 2 is a typical view illustrating a process of an internal short circuit occurring as a result of the movement of an electrode lead toward a battery cell due to external impacts applied to a conventional battery module.

Referring to these drawings, when an external force, such as an upward force or a downward force, is applied to battery cells 110 and 120, electrode leads 111 and 121 protruding from the upper ends of the battery cells 110 and 120 are brought into contact with electrode lead facing parts 211 and 221 constructed in the upward incline structure 211 (see FIG. 3) and in the curved incline structure 221 (see FIG. 4), with the result that the electrode leads 111 and 121 are deformed to absorb the external force. Consequently, the occurrence of an internal short circuit due to the movement of the electrode leads toward corresponding electrode assemblies (not shown) of the battery cells as shown in FIG. 2 is fundamentally prevented, and therefore, the safety of the battery module is greatly improved.

Figure 5:
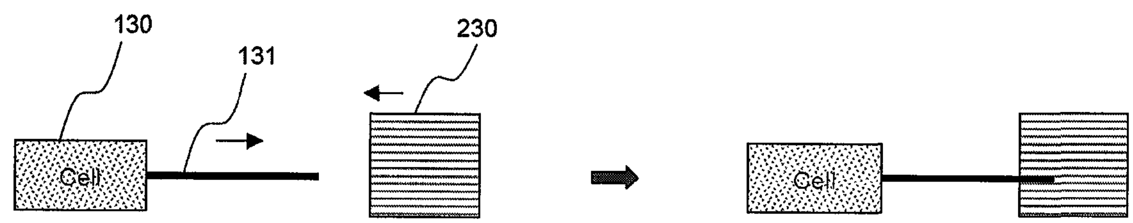
FIG. 5 is a typical view illustrating a process of absorbing an external force through the deformation of an electrode lead in a battery module according to a third preferred embodiment of the present invention.

FIG. 5 typically illustrates a process of absorbing external impacts through the deformation of the structure of an electrode lead facing part when the external impacts are applied to a battery module according to a further preferred embodiment of the present invention.

Referring to FIG. 5, when an external force, such as an upward force or a downward force, is applied to a battery cell 130, an electrode lead 131 protruding from the upper end of the battery cell 130 is inserted into an electrode lead facing part 231 to absorb the external force. Consequently, the occurrence of an internal short circuit due to the movement of the electrode lead 131 toward an electrode assembly (not shown) of the battery cell 130 is fundamentally prevented. Of course, the electrode lead facing part 231 may be deformed in various different manners in addition to the above-described manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery module according to the present invention has the following effects. When external impacts are directly or indirectly applied to the battery cell of the battery module, with the result that the electrode leads move toward the electrode assembly of the battery cell, the external impacts are absorbed by the deformation of the electrode leads or the deformation of predetermined regions ('electrode lead facing parts') of the module in direct contact with or adjacent to the electrode leads, whereby the occurrence of a short circuit due to the contact between the electrode assembly and the electrode leads is prevented, and therefore, the safety of the battery module against the external impacts is improved.

What is claimed is:

1. A battery module including at least one battery cell constructed in a structure in which an electrode assembly of a cathode/separator/anode structure is mounted in a battery case such that electrode leads of the electrode assembly protrude outside, the battery module including electrode lead facing parts, wherein, when external impacts are directly or indirectly applied to the at least one battery cell with the result that the electrode leads move toward the electrode assembly of the at least one battery cell, the external impacts are absorbed by the deformation of the electrode leads or the deformation of the electrode lead facing parts of the module in direct contact with or adjacent to the electrode leads, whereby the occurrence of a short circuit due to the contact between the electrode assembly and the electrode leads is prevented, and wherein the electrode lead facing parts are constructed in an upward or downward incline structure, or in an easily deformable structure, or are made of an easily deformable material.

2. The battery module according to claim 1, wherein the battery case is made of a laminate sheet including a resin layer and a metal layer.

3. A battery pack including a battery module according to claim 2.

4. The battery module according to claim 1, wherein the electrode assembly is constructed in a winding, stacking, or stacking/folding structure, and the electrode terminals are constructed in the form of a plate.

5. A battery pack including a battery module according to claim 4.

6. The battery module according to claim 1, wherein the electrode lead facing parts are constructed in a curved incline structure.

7. A battery pack including a battery module according to claim 6.

8. The battery module according to claim 1, wherein the at least one battery cell is mounted in a cartridge, and a plurality of cartridges are stacked to construct the battery module, the electrode lead facing parts being a portion of the cartridge in which the at least one battery cell is mounted.

9. A battery pack including a battery module according to claim 8.

10. The battery module according to claim 1, wherein a plurality of battery cells are mounted in a module case such that the battery cells are stacked, and the electrode lead facing parts being a portion of the module case in which the battery cells are mounted.

11. A battery pack including a battery module according to claim 10.

12. The battery module according to claim 1, wherein the at least one battery cell is a secondary battery or a super capacitor.

13. A battery pack including a battery module according to claim 12.

14. A battery pack including a battery module according to claim 1.

15. The battery pack according to claim 14, wherein the battery pack is used as a power source for electric vehicles, hybrid electric vehicles, electric bicycles, or electric motorcycles.

* * * * *